(No Model.)

H. WARDEN.
PUNCHING MACHINE TABLE.

No. 336,677. Patented Feb. 23, 1886.

United States Patent Office.

HENRY WARDEN, OF PHILADELPHIA, PENNSYLVANIA.

PUNCHING-MACHINE TABLE.

SPECIFICATION forming part of Letters Patent No. 336,677, dated February 23, 1886.

Application filed December 21, 1885. Serial No. 186,270. (No model.)

*To all whom it may concern:*

Be it known that I, HENRY WARDEN, of Philadelphia, Pennsylvania, have invented a new and useful Improvement in Punching-Machine Tables, of which the following is a full and true description, reference being had to the drawings, which form part of this specification.

My invention has reference to punching-machine tables of the general character of that shown and described in Letters Patent No. 213,770, granted to Thomas R. Morgan, April 1, 1879; and the object of my invention is to simplify the construction and arrangement of such tables and their carriages, and to enable the work to be moved and adjusted with greater ease and precision than has heretofore been practicable, reference being had to the drawings, which illustrate a table and its supporting-carriages made in accordance with my invention, and in which—

Figure 1:
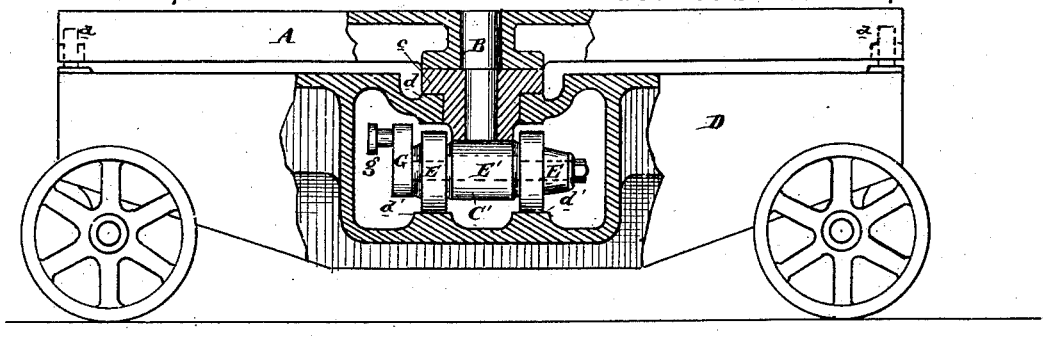
Figure 2:
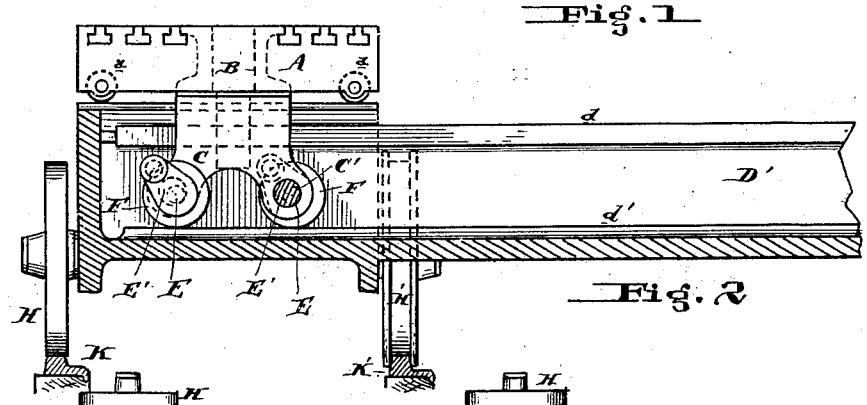
Figure 3:
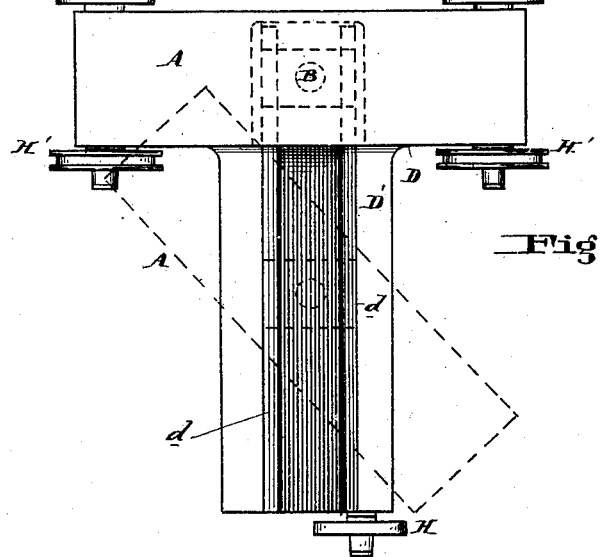
Figure 4:
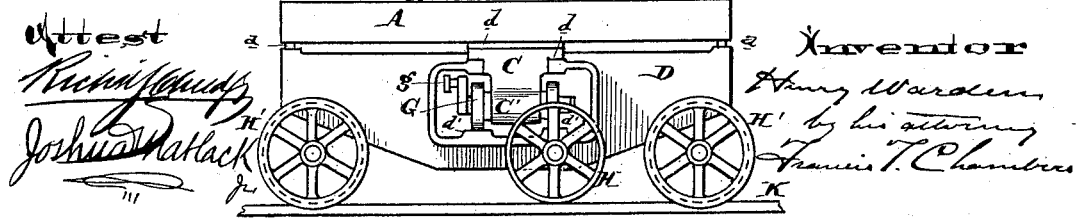

Figure 1 is a front elevation showing the upper carriage and center of the lower carriage and table in section. Fig. 2 is a sectional side elevation of the lower carriage through its center, showing the upper carriage and table in position. Fig. 3 is a plan view, and Fig. 4 a front elevation.

A is the table; B, the pivot, on which the table turns freely.

C is a movable carriage, on which the table A rests, and to which it is secured by the pivot-bolt B.

D D' is a movable carriage which supports the carriage C and table A, and which in turn is supported and moves on the stationary tracks K K K'.

The table D D' is made in the form of a letter T, and the part D', corresponding to the stem of the T, is open at the top, the edges of the openings forming bearings $d$, on which the flanges $c$ of the carriage C rest, and to which the carriage is bolted or clamped when the table is in use. At the bottom of the opening in D' are the tracks $d'$, upon which the wheels F run. These wheels are secured to axles E, which have their central section, E', made eccentric and journaled in projections $c'$ of the carriage C. To the ends of the axles E are secured crank-arms G, having pins $g$, to which a rod may be attached, which will extend out through the open space in D.

When it is desired to move the table along the arm D' of the lower carriage, the axles E E' E are turned so that the ends E E move downward and raise the table upon the wheels F and away from the guides $d$. The carriage C may then be easily moved along the tracks $d'$ and again lowered till it rests on the guides $d$, when it reaches approximately the desired position. The carriage D D' is supported on the tracks K K' through wheels H H H', of which two or more, H' H', on the part D of the carriage and in the same line, are flanged and serve as guides to insure the carriage moving in a straight line.

The fixed tracks K K' are placed so that they run across and in front of the punching-machine, the motion of the carriage C being therefore to and from the machine.

The T shape of my carriage D D' enables me to give it great strength and rigidity, so that it will not bend or sag in moving, and by enabling me to place the guide-wheels H' at a considerable distance apart the necessity of racks along the fixed rails—such as are shown in the Morgan patent—is avoided, the flanged wheels insuring a straight motion, and a single man being quite sufficient to move the carriage and its burden.

The racks along the main tracks H H' and pinions attached to an axle supported on the carriage D D' may still be used to clamp the carriage in position.

While my improved table is especially designed for punching-machines, it is of course obvious that it may be used with advantage for supporting the work for planing, shearing, or other machines.

Having now described my invention, what I claim as new, and desire to secure by Letters Patent, is—

1. In a work-supporting device substantially as specified, a T-shaped main carriage supported and guided upon fixed rails, and having its central arm provided with bearings at right angles to the stationary track.

2. In a work-supporting device substantially as specified, the combination of a T-shaped main carriage having supporting-wheels H and supporting and guiding wheels H', and the stationary tracks K K'.

3. In a work-supporting device substantially as specified, the combination of the T- shaped main carriage having tracks $d'$ and bearing-surfaces $d$ with the carriage C, having wheels F, connected to it by means of the eccentric shafts E E' E, and means for turning said shaft in its bearing.

4. In a work-supporting device substantially as specified, the combination of the pivoted table A, the carriage C, having bearing-surfaces $c$, and wheels F, connected with it by eccentric axles E E' E, the carriage D D', having bearings $d$ and tracks $d'$ and supported by wheels H H', running on tracks K K'.

HENRY WARDEN.

Witnesses:
RICHD. S. CHILD, Jr.,
JOSHUA MATLACK, Jr.